United States Patent
Graf et al.

(10) Patent No.: US 9,366,584 B2
(45) Date of Patent: Jun. 14, 2016

(54) PORTABLE ELECTRONIC DEVICE

(71) Applicant: Sensirion AG, Stafa (CH)

(72) Inventors: Markus Graf, Zurich (CH); Andreas Tiefenauer, Zurich (CH); Andrea Sacchetti, Zurich (CH); Dominik Niederberger, Zurich (CH)

(73) Assignee: Sensirion AG, Stafa (CH)

( * ) Notice: Subject to any disclaimer, the term of this patent is extended or adjusted under 35 U.S.C. 154(b) by 0 days.

(21) Appl. No.: 14/437,753

(22) PCT Filed: Nov. 1, 2013

(86) PCT No.: PCT/CH2013/000191
§ 371 (c)(1),
(2) Date: Apr. 22, 2015

(87) PCT Pub. No.: WO2014/067022
PCT Pub. Date: May 8, 2014

(65) Prior Publication Data
US 2015/0292959 A1 Oct. 15, 2015

(30) Foreign Application Priority Data

Nov. 2, 2012 (EP) .................................... 12007492

(51) Int. Cl.
*G01K 15/00* (2006.01)
*G01K 13/00* (2006.01)
(Continued)

(52) U.S. Cl.
CPC ................. *G01K 15/005* (2013.01); *G01K 1/20* (2013.01); *G01K 7/42* (2013.01); *G01K 13/00* (2013.01)

(58) Field of Classification Search
USPC ............................................. 374/1, 141, 110
See application file for complete search history.

(56) References Cited

U.S. PATENT DOCUMENTS 2,682,715 A * 7/1954 Walby .................... A01G 23/06
  137/636.4
3,817,453 A   6/1974 Pinckaers
(Continued)

FOREIGN PATENT DOCUMENTS

EP          0387025        9/1990
JP        2010101741        5/2010
(Continued)

OTHER PUBLICATIONS

International Search Report No. PCT/CH2013/000191, dated Dec. 4, 2013, completed on Nov. 27, 2013.
(Continued)

*Primary Examiner* — Mirellys Jagan
(74) *Attorney, Agent, or Firm* — Cooper & Dunham LLP (57) ABSTRACT

In a portable electronic device components (2) consuming electrical power during operation may generate heat. A temperature sensor (1) for sensing an ambient temperature ($T_S$) of the portable electronic device may as a consequence not supply the correct temperature value. It is suggested to provide a compensator (4) for determining a compensated ambient temperature ($T_A$) dependent on at least the sensed ambient temperature ($T_S$) and information ($P_i$) related to the electrical power consumed by at least one of the components (2). After a power down and a reactivation of the portable electronic device, actual internal states (x(b)) of the compensation model are estimated dependent on last internal states (x(a)) stored at the power down, dependent on an estimated course of the sensed temperature ($T^*_S$) between the interruption and the reactivation, and dependent on an estimated course of the information ($P^*_i$) related to the electrical power consumed by the at least one heat source (2) between the interruption and the reactivation.

15 Claims, 4 Drawing Sheets

(51) Int. Cl.
*G01K 1/20* (2006.01)
*G01K 7/42* (2006.01)

(56) References Cited

U.S. PATENT DOCUMENTS

| | | | |
|---|---|---|---|
| 4,096,575 A | 6/1978 | Itoh | |
| 5,199,637 A | 4/1993 | Adams | |
| 5,502,838 A | 3/1996 | Kikinis | |
| 5,721,837 A | 2/1998 | Kikinis et al. | |
| 6,912,386 B1 | 6/2005 | Himberg et al. | |
| 7,027,834 B2 | 4/2006 | Soini et al. | |
| 7,280,301 B1 | 10/2007 | Jackson et al. | |
| 7,364,353 B2 | 4/2008 | Kolk | |
| 7,748,895 B2* | 7/2010 | Sri-Jayantha | G06F 1/206 374/134 |
| 7,784,705 B2* | 8/2010 | Kasper | F24F 11/006 236/44 C |
| 7,853,813 B2* | 12/2010 | Lee | G06F 1/3203 320/127 |
| 8,237,386 B2* | 8/2012 | Culbert | G05D 23/2442 318/471 |
| 8,666,460 B2* | 3/2014 | Weinberg | G06F 1/3203 370/338 |
| 8,949,066 B2* | 2/2015 | Aljabari | G01K 1/20 374/110 |
| 2009/0144014 A1 | 6/2009 | Aljabari | |
| 2011/0119018 A1 | 5/2011 | Skarp | |
| 2011/0307208 A1 | 12/2011 | Graf et al. | |
| 2014/0321503 A1* | 10/2014 | Niederberger | G01K 1/20 374/137 |
| 2014/0328367 A1* | 11/2014 | Niederberger | G01K 1/20 374/1 |
| 2014/0328368 A1* | 11/2014 | Niederberger | G01K 1/20 374/1 |
| 2014/0355649 A1* | 12/2014 | Niederberger | G01D 3/0365 374/152 |
| 2015/0192477 A1* | 7/2015 | Sacchetti | G01K 1/20 374/152 |
| 2015/0241370 A1* | 8/2015 | Mueller | G06F 3/0418 345/173 |

FOREIGN PATENT DOCUMENTS

| | | |
|---|---|---|
| WO | 0169341 | 9/2001 |
| WO | 2010139473 | 12/2010 |
| WO | 2014005235 | 1/2014 |
| WO | 20140005234 | 1/2014 |

OTHER PUBLICATIONS

European Search Report No. 1207492, dated Oct. 8, 2013, completed on Sep. 24, 2013 and European Search Opinion.

* cited by examiner

PORTABLE ELECTRONIC DEVICE

CROSS REFERENCE TO RELATED APPLICATIONS

This application is a §371 national stage of PCT International Application No. PCT/CH2013/000191, filed Nov. 1, 2013, claiming priority of European Patent Application 12007492.7, filed Nov. 2, 2012, the contents of each of which are incorporated herein by reference in their entireties.

TECHNICAL FIELD

The present invention relates to a method for operating a portable electronic device, to a computer program element for operating a portable electronic device, and to a portable electronic device.

BACKGROUND ART

It is desired to conduct a precise measurement of a temperature with a portable electronic device such as a mobile phone or a portable computing device, which portable electronic device typically comprises a processor and/or a display generating heat during operation. The temperature of interest may be, for example, an internal temperature of the device at a given location, or may be a temperature ambient to the portable electronic device to be measured by the portable electronic device.

DISCLOSURE OF THE INVENTION

This problem is solved by a method for operating a portable electronic device according to the features of claim 1, and by a portable electronic device according to the features of claim 12.

The portable electronic device comprises a temperature sensor for sensing a temperature. The temperature of interest may be, for example, an internal temperature of the device at a given location. For example, the temperature of interest may be a temperature of the central processing unit of the device, or a temperature of the battery. Hence, the given location at which the temperature shall be determined may in these instances be the location of the central processing unit or the battery respectively. In a preferred embodiment, the temperature sensor is directly arranged at such location. In another variant, the temperature of interest may be a temperature ambient to the portable electronic device. Here, the temperature sensor preferably provides a sufficient thermal coupling to the environment of the portable electronic device, e.g. by exposing the temperature sensor to the ambient through openings in a housing of the device or by other means.

However, given that the portable electronic device, which may be a mobile phone or a portable electronic computing device in one embodiment, typically comprises components that consume electrical power and thereby release heat during operation, such as a processor and/or a display for example, the temperature sensed by the temperature sensor may be impacted in view of heat migrating from such component to the temperature sensor. Any such component may also be denoted as heat source in the following. Such heat source may impact the temperature sensing in that the temperature sensor no longer reflects the real temperature at the given location but reflects the real temperature perturbed by the self-heating of the one or more heat sources. Hence, the present portable electronic device comprises a compensator, also referred to as compensation model, for determining a compensated temperature which preferably better reflects the real temperature at the given location. This compensated temperature represents an estimate of the real temperature based on the sensed temperature as supplied by the temperature sensor and by taking into account the heat generated by at least at one of the heat sources of the device via information being related to the electrical power consumed by this component.

As a result, the sensed temperature preferably may be corrected by a temperature value owed to the heat transferred from the subject heat source to the temperature sensor. In another embodiment, the given location at which the determination of a compensated temperature is of interest not necessarily coincides with the location the temperature sensor is arranged at. The temperature may be determined for any location of the portable electronic device in view of taking heat propagation into account from the at least one heat source to the given location and from the location of the temperature sensor to the given location.

Preferably, all components of the device acting as major heat sources are involved in the compensation process, i.e. power consumption related information of all these components are included in compensating the sensed temperature. A determination of major heat sources may be accomplished in relative terms by comparing the heat sources with each other and selecting the n heat sources that generated the most heat amongst the heat sources available. In a different approach, the n heat sources that have most impact on the temperature sensor are selected as major heat sources. In this approach the heat of a heat source propagated to the temperature sensor is the key criteria for selection, given that a heat source generating only little heat but being thermally well coupled to the temperature sensor may affect the sensing of the temperature most. For both approaches, a threshold may allow for selection, and in both approaches n may be at least one or more.

In a preferred embodiment, a display of the portable electronic device may be the at least one heat source that may be taken into account for determining the compensated temperature, wherein power consumption related information of the display may be used for the compensation. Given that in todays smart phones or tablet computers displays are at large scale, a display may represent a major heat source during operation and as such affects the measurement of the temperature by the temperature sensor.

In general, the power consumed in the relevant component may be measured and contributes to the determination of the compensated temperature. However, other information representing or allowing for assessing the power consumed by the relevant component instead or additionally may contribute to the determination of the compensated temperature. In the above embodiment of the display, an intensity of the display may constitute the power related information used for the reason that the brighter the display is operated the more power it consumes. A measure for the intensity of the display, however, may easily be available, e.g. in form of an intensity adjustment setting, while the exact power consumed by the display may be difficult to measure.

In another embodiment, an energy supply of the portable electronic device, e.g. a battery, may represent a component radiating heat at least during its recharge. Therefore, the energy supply can be considered as a power consumer in the portable electronic device. The power consumed by the power supply may be measured and used for compensation purposes. However, in another approach, information as to a charge level of the energy supply may be used instead given that the charge level as a measure of the power consumed may be available anyway as it is typically displayed to the user. In another approach, a derivative of the charge level may be used instead of the charge level, or in addition to.

It is preferred, that in addition to the power related information of one or more components of the portable electronic device, the compensated temperature may also be determined based on a thermal conductivity of a heat path between the one or more heat sources and the given location or the temperature sensor. This measure may make the determination of the compensated temperature even more precise since it takes into account the heat flux that effectively arrives at the temperature sensor rather than the bare heat that is generated at by the component.

In another embodiment, in addition to the power related information of one or more heat sources, the compensated ambient temperature may be determined based on a thermal capacity of one or more of thermal capacitances in the portable electronic device. Such thermal capacitance may be represented by any element of the portable electronic device being capable of storing thermal energy. For example, a housing of the portable electronic device or parts thereof may be considered as a thermal capacitance. The thermal capacitance does not necessarily consume electrical power but may be heated by components which consume electrical power. The thermal capacitance may store the supplied thermal energy over some time. Such heat may be transferred to the temperature sensor via a thermal conducting path especially when the temperature at the temperature sensor is lower than the temperature of the thermal capacitance.

Preferably, it is only the major thermal capacitances that are taken into account for determining the compensated ambient temperature. Generally, it depends on the design of the portable electronic device how many components, thermal paths or thermal capacitances are available in the portable electronic device and which of these are selected for contributing to the compensation.

Preferably, the portable electronic device may be one of a mobile phone, and especially a smart phone, a handheld computer, an electronic reader, a tablet computer, a game controller, a pointing device, a photo or a video camera, a computer peripheral.

There may be scenarios in which the temperature sensor at least temporarily is not available. Such period may be started by an interruption followed by a later on reactivation. During this period, no up to date compensated temperatures can be determined due to lack of sensed temperature values. After the reactivation a then actual compensated temperature may be determined dependent on the then sensed actual temperature and dependent on the then actual power information.

However, given that it is preferred to use a state space model for representing the compensator for determining the compensated temperature, the compensated temperature is also dependent on internal states of the state space model of the compensator, and specifically on internal states of the compensator of the past. At reactivation it is preferred to estimate the then actual internal states of the compensator. For doing so, the internal states prior to interruption are stored as last internal states, preferably in a non-volatile memory of the portable electronic device. At the reactivation the then actual internal states of the thermal model are estimated dependent on the stored last internal states, and dependent on an estimated course of the sensed temperature between the interruption and the reactivation, and dependent on an estimated course of the information related to the electrical power consumed by the at least one heat source between the interruption and the reactivation.

By means of such an estimate of the actual internal states at reactivation the quality of an actual compensated temperature to be determined at reactivation can be improved.

Preferably, the estimated course of the information related to the electrical power consumed by the at least one heat source is set to zero between the interruption and the reactivation of the operation under the assumption that the interruption is a power down of the portable electronic device including a cut off of the various heat sources from power.

Preferably, the estimated course of the sensed temperature at the location of the temperature sensor between the interruption and the reactivation of the operation is predefined as one of a course of temperature declining exponentially from a temperature sensed prior to/at the interruption towards an ambient temperature of the portable electronic device, a course of temperature declining linear from a temperature sensed at the interruption towards an ambient temperature of the portable electronic device, or a spline interpolation between a temperature sensed at the interruption towards an ambient temperature of the portable electronic device.

Specifically, the estimated course of the temperature and the estimated course of the information are predefined and are stored in the non-volatile memory.

As to the determination of the actual internal states of the compensator after the interruption there are two alternatives: In one embodiment, the actual internal states of the thermal model at the time of reactivation are based on sets of estimated intermediate internal states for intermediate points in time between the interruption and the reactivation. Each set of intermediate internal states is thereby estimated dependent on a previous set of intermediate internal states for a previous intermediate point in time and dependent on an estimated value of the sensed temperature and an estimated value of the information related to the electrical power of the at least one heat source at the present intermediate point in time. In an alternate embodiment, the actual internal states of the thermal model are estimated solely dependent on the stored last internal states without estimating a set of intermediate internal states for intermediate points in time between the interruption and the reactivation.

According to a further aspect of the present invention, a computer program element is provided for operating a portable electronic device, which computer program element, which preferably is stored on a computer storage medium, comprises computer program code means for receiving a temperature value sensed by a temperature sensor of the portable electronic device, for receiving information related to electrical power consumed by at least one heat source of the portable electronic device, and for determining a compensated temperature for a given location of the portable electronic device dependent on at least the sensed temperature value, the information related to the electrical power consumed by the at least one heat source, and internal states of a compensation model of the portable electronic device. At an interruption of an operation of the temperature sensor the computer program code means are adapted to store last internal states of the compensation model. At a reactivation of the operation of the portable electronic device the computer program code means are adapted to estimate actual internal states of the compensation model dependent on the stored last internal states, dependent on an estimated course of the sensed temperature between the interruption and the reactivation, and dependent on an estimated course of the information related to the electrical power consumed by the at least one heat source between the interruption and the reactivation.

Other advantageous embodiments are listed in the dependent claims as well as in the description below. The described embodiments similarly pertain to the device, the method, and the computer program element. Synergetic effects may arise from different combinations of the embodiments although they might not be described in detail.

Further on it shall be noted that all embodiments of the present invention concerning a method might be carried out in the order of the steps as described. Nevertheless this has not to be the only essential order of steps but all different orders of the method steps where technically feasible shall be comprised in the scope of the claims and be disclosed by the method claims.

BRIEF DESCRIPTION OF THE DRAWINGS

The detailed description refers to embodiments of the present invention. Such description makes reference to the annexed drawings, wherein.

DETAILED DESCRIPTION

Figure 1:
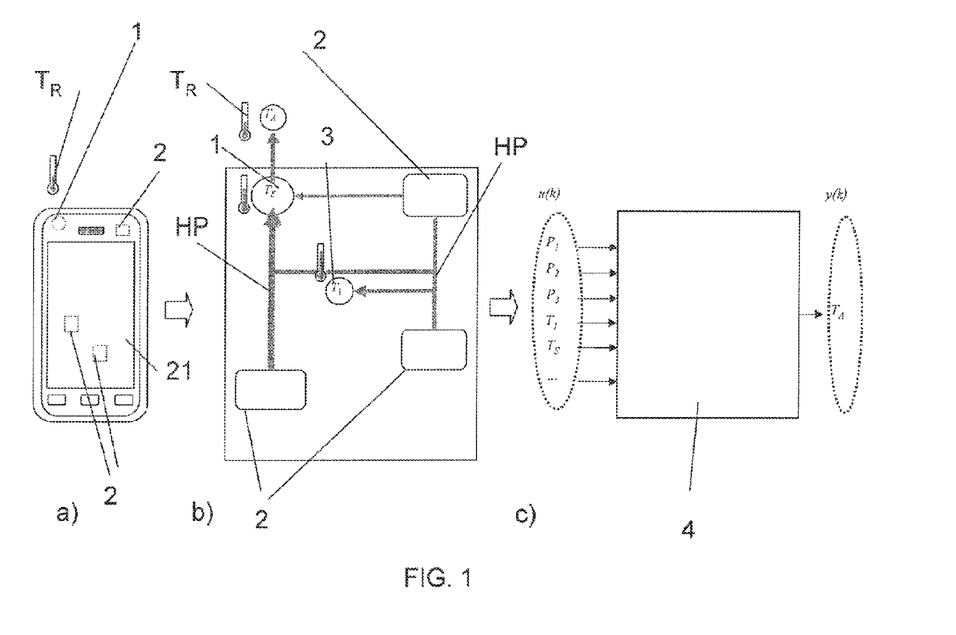
FIG. 1 illustrates a mobile phone according to an embodiment of the present invention in diagram a), an associated thermal block diagram in diagram b), and an associate compensator in diagram c)

FIG. 1a) shows a diagram illustrating a mobile phone according to an embodiment of the present invention. The mobile phone includes a temperature sensor 1 and several components 2 generating heat during operation of the mobile phone. The temperature sensor 1 provides a sensed ambient temperature $T_S$.

The temperature sensor 1 itself may not provide the real ambient temperature $T_R$ but a sensed ambient temperature $T_S$ deviating from the real ambient temperature $T_R$ because of a self-heating of the device that perturbs the internal temperature sensor 1. Another reason may be a slow dynamic that slows down a temperature response of the temperature sensor 1 when the real ambient temperature $T_R$ is changing.

In one embodiment, a method is described in how a signal of an integrated temperature sensor is compensated in order to more accurately determine the ambient temperature. This compensator preferably uses information of power consumption and/or temperature of electronic components in the device that act as heat sources during operation, and preferably calculates a heat propagation in time towards the temperature sensor for sensing the ambient temperature such that its influence can be compensated from the temperature sensor signal of the temperature sensor.

A display of the mobile phone is denoted by reference numeral 21. The display 21 may be one of the components that consume electrical energy and act as a heat source while doing so. Other heat generating components may be a central processing unit, or a battery of the mobile phone.

The real ambient temperature $T_R$ is desired to be estimated by the portable electronic device by means of determining a compensated ambient temperature $T_A$.

Switching to diagram 1b), a "thermal" block diagram of the mobile phone of diagram 1a) is shown. The heat generating components 2 are connected to the temperature sensor 1 and to each other by heat paths HP on which heat flux is propagated. In the present embodiment, another temperature sensor 3 is provided which other temperature sensor 3 may act as a sensor for sensing the temperature $T_1$ of a central processing unit of the device, or of any other component or location.

Preferably, a heat flux propagating to the temperature sensor 1 may be determined and be compensated for at the temperature sensor 1 by a compensator 4 as is shown in diagram 1c). The compensator 4 may be an entity, represented by hardware, software, or a combination of both, which receives the sensed ambient temperature $T_S$, the sensed temperature $T_1$, and information $P_1$, $P_2$, $P_3$ related to the power consumption of the three components 2 identified as most crucial in impacting the sensed ambient temperature $T_S$. The compensator 4 supplies at its output the compensated ambient temperature $T_A$.

In general, the compensator 4 may make use of a dynamic thermal model of the mobile device such as, for example, is shown in diagram 1b). The dynamic thermal model may mathematically be described by a differential equation system. The model may in one embodiment comprise one or more, and preferably the most relevant heat sources, and in another embodiment additionally one or more, and preferably the most relevant thermal conductivities, and in another embodiment additionally one or more, and preferably the most relevant heat capacities, as well as it comprises the temperature sensor, and it may comprise one or more optional temperature sensors that may be available in the mobile device.

The compensated ambient temperature $T_A$ may then be estimated from these inputs by using the following Equation 1) as compensator 4:

$$x(k+1)=Ax(k)+Bu(k)$$

$$y(k)=Cx(k)+Bu(k) \quad \text{Collectively Equation 1)}$$

with u(k) denoting the inputs at time step k, y(k) denoting the output $T_A$, and x(k) denoting an internal state vector of the compensator. A is an n-by-n matrix, B an n-by-m matrix, C an 1-by-n matrix and D an 1-by-m matrix, where n is the number of states that depends on the complexity of the model and m the number of inputs. Typical inputs may be, for example, an intensity of a display, a time derivative of a battery charge level, a central processing unit load, or other power management information. Additional temperature sensors at hot spots of the portable electronic device may improve the compensation results.

Hence, in one embodiment, the portable electronic device is modelled as a thermal system with heat sources, and optionally with heat capacities and/or thermal conductivities. From this model, a time-discrete compensator 4 according to the state space description of Equation 1) is derived, that can easily be implemented on a microprocessor of the portable electronic device by using the following software code:

```
while not stopped
{
    u=Read_Input ( ) ;        // Read input
    y=C*x+D*u;                // Calculate output
    x=A*x+B*u;                // State Update
    T_A=y;                    // Ambient Temperature = y
}
```

The compensated temperature $T_A$ may be displayed on the display 21.

Figure 2:
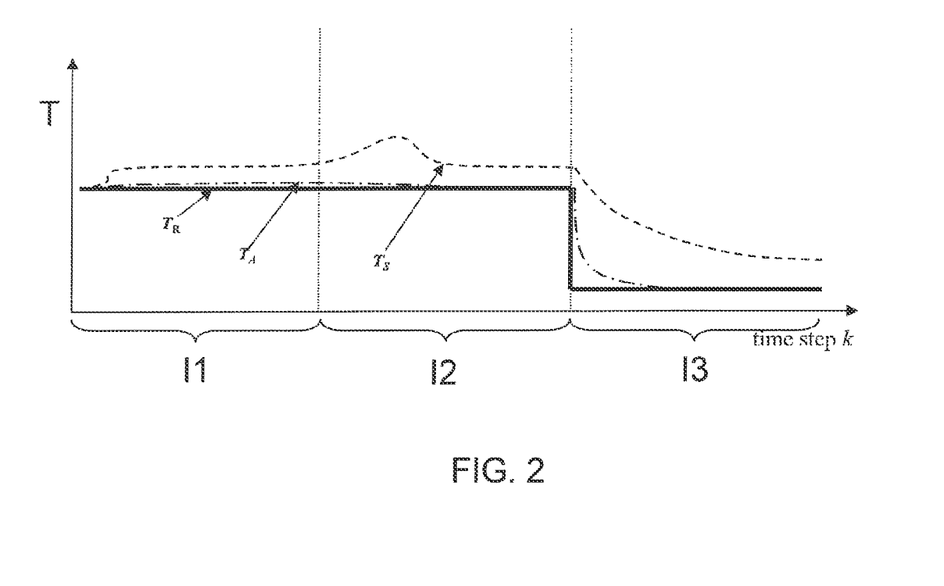
FIG. 2 shows a chart of different temperature signals over time illustrating the compensating effect according to embodiments of the present invention.

In a temperature T over time t chart according to FIG. 2, in which time t is represented by discrete time steps k*Δt, a sample real temperature characteristic $T_R$ in the ambient of a portable electronic device is shown by the straight line. The dashed line represents a corresponding ambient temperature $T_S$ as sensed by a temperature sensor of the mobile device. It becomes apparent from the chart in FIG. 2 that due to internal heating the temperature sensor detects an ambient temperature $T_S$ higher than the real ambient temperature $T_R$. Interval I1 may, for example, represent a time interval, in which the mobile device is operated at average load. However, in interval I2, it assumed that the mobile device at least temporarily is operated at high load, for example, by executing a video game requiring massive computational and display resources. This results in the sensed ambient temperature $T_S$ even more deviating from the real ambient temperature $T_R$: At the end of interval I2, the real ambient temperature $T_R$ drops, for example, due to the user of the mobile device entering a basement. The sensed ambient temperature $T_S$ follows the temperature drop in the real ambient temperature $T_R$ only slowly.

The dashed-dotted line, on the other hand, illustrates a compensated ambient temperature $T_A$ which is determined by using a compensator such as illustrated in diagram 1c), which is based on a thermal model of the portable electronic device. It can be seen, that from the beginning of the operation of the portable electronic device, a deviation of the compensated ambient temperature $T_A$ from the real ambient temperature $T_R$ is minimized, at least the compensated ambient temperature $T_A$ is lower than the sensed ambient temperature $T_S$. Even the high load operations of the mobile device releasing lots of heat do not impact the compensated ambient temperature $T_A$ very much.

In interval I3, the compensated ambient temperature $T_A$ much quicker aligns with the drop in the real ambient temperature $T_R$. This effect may be caused by implementing a temperature dependent compensation of dynamic contributions of the sensed ambient temperature $T_S$ in the compensator. A dynamic contribution is understood as any contribution in the spectral range with a frequency f>0 Hz. In case of a fast varying ambient temperature such as the step function at the end of interval I2, the compensator is enabled to accelerate the thermal dynamics of the mobile device such that the compensated ambient temperature $T_A$ responds faster to changes in the real ambient temperature $T_R$, and consequently in the sensed ambient temperature $T_S$. For such temperature dependent compensation of the dynamics of the sensed ambient temperature signal, it is referred to US Patent Publication US 2011/0307208.

A compensator as may be used in any of the above embodiments—and which compensator may also be referred to as filter, Kalman filter, state-space estimators etc.—is used to improve the sensor signal. The compensator preferably is implemented as a differential equation system, see equation 1), which depends on values of the past, and specifically values of internal states x(k) of the past. When a compensator is started for the very first time, initial values of internal states of the compensator are required. A state-of-the-art assumption for such scenario is that the initial values of internal states are calculated based on the assumption that the system is in a steady-state. In such assumption, the initial values of the internal states x(k+1) at the initial point in time k+1 are assumed to be equal to the internal states x(k) of a previous point in time k. This assumption is reasonable if the sensor system is started for the very first time or if the sensor system was turned off for a long time.

However, in case the sensor system was turned off/interrupted for a rather short time and then is reactivated, the sensor system is not in a steady-state and the actual values of the internal states after such interruption may deviate to a large extent from the real actual internal states. Any such deviation may result in a falsified compensated output signal at least in the period after reactivating.

Figure 3:
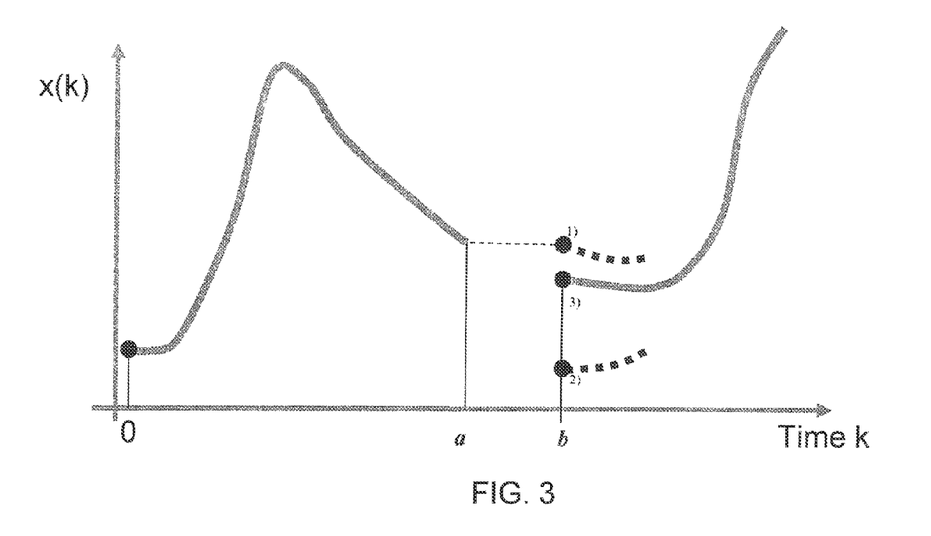
FIG. 3 shows a sample course of internal states x(k) over time k including a variant when having applied a method according to an embodiment of the present invention.

FIG. 3 illustrates a sample course of internal states x(k) over time k. Between k=0 which denotes a start of operation of the portable electronic device and k=a a sample course of internal states x(k) according to the state space description of equation 1) is shown. At k=a it is assumed that the portable electronic device is shut down such that no up to date temperature values are available any longer. In another scenario, the portable electronic device may remain turned on at k=a, however, the temperature sensor may stop being operational at this point in time due to power limitation, for example. Therefore, a time gap a<k<b with no sensor signal information may occur, e.g. when the sensor system goes into sleep-mode or is completely turned-off for a while. At k=b, the sensor system goes back operational. At k=b, no information of the past is available, and specifically no information as to internal states during the interval a<k<b is available.

Bullet 3) in the diagram of FIG. 3 shows actual internal states at actual time k=b under the assumption that the system at k=b is in a steady state, wherein in equation 1) x(k)=Ax(k)+Bu(k) such that x(b)=(I−A)$^{-1}$Bu(a). However, the estimated actual internal states differ from real actual internal states of bullet 3) and as such may not serve as an ideal basis for a determination of the compensated temperature at time k=b. In another assumption according to bullet 1) the internal states at time k=b may be set to the internal states at time k=a, i.e. x(b)=x(a) assuming that the internal states have not changed during the interval a<k<b. However, the estimated actual internal states according to bullet 1) differ from the real internal states of bullet 3) and as such may not serve as an ideal basis for a determination of the compensated temperature at time k=b either.

The real actual internal states x(b) at time k=b may best be represented by applying an assumption according to an embodiment of the present invention, which assumption takes into account an estimated input u*(k) to the compensator during the period a<k<b. For example if a mobile device goes into sleep mode, most of the components are turned-off and the main power consumption is zero. For this reason, the information related to the power consumption for any heat source being accounted for in the thermal model, is set to zero given that it is assumed that in such scenario no power is consumed by any of the heat sources. On the other hand, the sensed temperature input may preferably be estimated to converge exponentially to an ambient temperature.

With this information, it is possible to simulate internal states between a and b to get the actual internal states at point in time b:

$$x(b) = e^{A_C(b-a)} x(a) + A_C^{-1}(e^{A_C(b-a)} - 1) B_C u^* \quad \text{Equation 2)}$$

Equation 2) is a direct result of equation 1) by applying the above criteria a mapping between the time discrete state space description of equation 1) and the associate time continuous description of the differential equation system representing the compensator given by:

$$\frac{dx(t)}{dt} = A_C x(t) + B_C u(t)$$
$$y(t) = C_C x(t) + B_C u(t)$$

Collectively equation 3)

with the following correspondences:

$$A = e^{A_C T_S}$$

and $$B = A_C^{-1}(e^{A_C T_S} - 1) B_C$$

and $T_S$ being the sampling time.

Equation 2) can be interpreted as internal states definition for a sampling interval b-a.

In this notation, u* is a reasonable assumption for the input vector between a and b and x(a) denotes the last internal states vector stored before interruption at time k=a.

Figure 4:
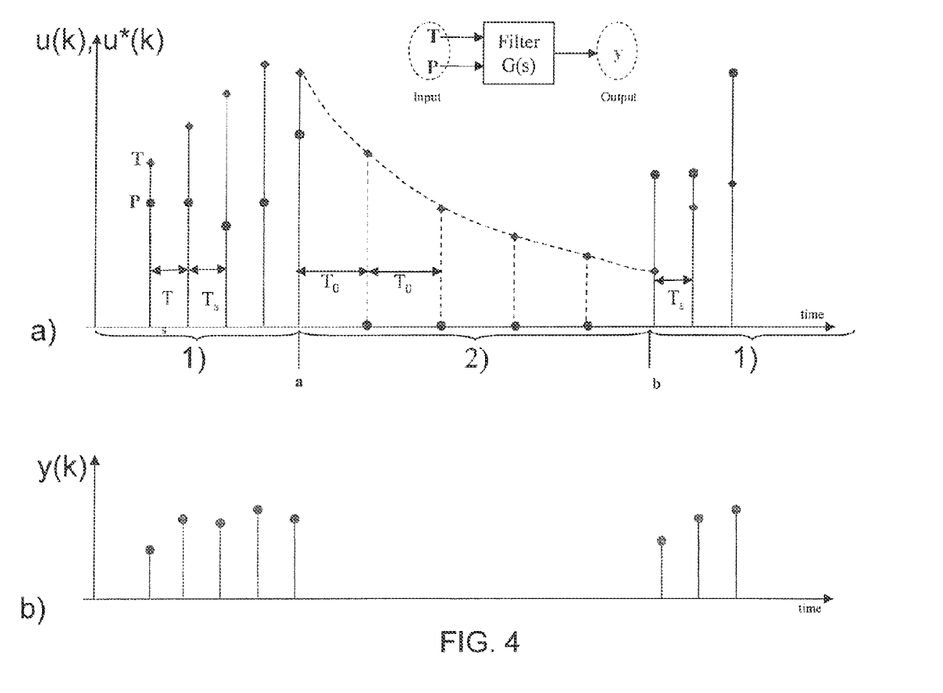
FIG. 4 shows a sample course of an estimated input u*(k) and a compensated output y(k) when having applied a method according to an embodiment of the present invention.

FIG. 4 shows in diagram a) a sample course of an input u(k), u*(k) wherein u*(k) denotes an estimation of u(k) during inoperability of the temperature sensing function. Prior to time a, the portable electronic device is operational for the interval 1) and an input vector u(k) is sensed which in the present example encompasses a sensed temperature T the values of which are represented by diamonds at discrete time steps $k*T_S$, and power related information P the values of which are represented by circles at discrete time steps $k*T_S$. It is assumed that at time a the temperature sensing is interrupted for the interval a<k<b, see interval 2). During this interval 2), a predefined course of the input vector u*(t) is estimated with P=0 during this interval and $$T=A*(1-\exp(-r*t))+T_{Amb} \quad \text{Equation 4}$$

with A denoting the temperature at interruption a, and $T_{Amb}$ denoting the ambient temperature, and r denoting a time constant.

However, any other function or interpolation approach may be used for estimating the course of the temperature T during the period in time at which no sensed temperature values are available.

The discrete time steps $k*T0$ for which the estimates are provided may be different from the time steps during regular operation 1).

At time b, the device is reactivated and new input values of the vector u(k) can now be measured again. For the interval a<k<b sets of internal state vectors are determined. For each discrete time step $k*T0$ a set of internal states may be determined. Accordingly, an actual internal state vector can be estimated for time b according to FIG. 3, such that based on the estimated actual internal states x(t) at time b and the actual inputs T and P and time b the actual compensated temperature $T_A$=y(b) can be determined.

Present embodiments of the invention benefit from a compensator for estimating a compensated ambient temperature in portable electronic devices by compensating disturbances caused by electronic components acting as internal heat sources during operation of the device. The compensated ambient temperature reflects the real ambient temperature with only small or no tolerances.

The invention claimed is:

1. A method for operating a portable electronic device, comprising
   - sensing a temperature with a temperature sensor of the portable electronic device,
   - determining a compensated temperature for a given location of the portable electronic device depending on at least the sensed temperature, information related to electrical power consumed by at least one heat source of the portable electronic device, and internal states of a compensation model for determining the compensated temperature,
   - at an interruption of an operation of the temperature sensor, storing last internal states of the compensation model, and
   - at a reactivation of the operation of the temperature sensor, estimating actual internal states of the compensation model depending on the stored last internal states, depending on an estimated course of the sensed temperature between the interruption and the reactivation, and depending on an estimated course of the information related to the electrical power consumed by the at least one heat source between the interruption and the reactivation.

2. A method according to claim 1, comprising
   at the reactivation of the operation of the temperature sensor, determining an actual compensated temperature for the given location dependent on the estimated actual internal states, dependent on an actual temperature sensed by the temperature sensor, and dependent on actual information related to the electrical power consumed by the at least one heat source.

3. A method according to claim 1,
   wherein the last internal states are stored in a non-volatile memory of the portable electronic device, and
   in particular, wherein the estimated course of the sensed temperature and the estimated course of the information are predefined and are stored in the non-volatile memory.

4. A method according to claim 1,
   wherein the information related to the electrical power consumed by the at least one heat source includes information related to the electrical power consumed by one or more of a display, a battery and a central processing unit of the portable electronic device.

5. A method according to claim 1,
   wherein the given location represents a location of the temperature sensor, and
   wherein the compensated temperature at the given location represents the sensed temperature adjusted by a temperature value representing an impact of heat released from the at least one heat source and propagated via one or more heat paths to the temperature sensor.

6. A method according to claim 1,
   wherein the estimated course of the sensed temperature between the interruption and the reactivation is predefined as one of:
   - a course of temperature declining exponentially from a temperature sensed at the interruption towards an ambient temperature of the portable electronic device,
   - a course of temperature declining linearly from a temperature sensed at the interruption towards an ambient temperature of the portable electronic device,
   - a spline interpolation between a temperature sensed at the interruption towards an ambient temperature of the portable electronic device.

7. A method according to claim 1,
   wherein the estimated course of the information related to the electrical power consumed by the at least one heat source is set to zero between the interruption and the reactivation.

8. A method according to claim 1,
   wherein, for estimating the actual internal states of the compensation model at the reactivation, sets of intermediate internal states are estimated for intermediate points in time between the interruption and the reactivation, and
   wherein each of said sets of intermediate internal states is estimated depending on a previous set of intermediate internal states for a previous intermediate point in time and depending on an estimated value of the sensed temperature and an estimated value of the information related to the electrical power of the at least one heat source at the present intermediate point in time.

9. A method according to claim 1,
   wherein the actual internal states of the compensation model are estimated solely depending on the stored last internal states without estimating a set of intermediate internal states for intermediate points in time between the interruption and the reactivation.

10. A method according to claim 1,
wherein the compensation model is represented by a thermal model of the portable electronic device for determining a heat propagation as a function of time from the at least one heat source to the given location.

11. A computer program product for operating a portable electronic device, comprising computer program code means for implementing the following steps when executed on a processor of the portable electronic device:
  receiving a temperature sensed by a temperature sensor of the portable electronic device,
  receiving information related to electrical power consumed by at least one heat source of the portable electronic device,
  determining a compensated temperature for a given location of the portable electronic device depending on at least the sensed temperature, the information related to the electrical power consumed by the at least one heat source, and internal states of a compensation model for determining the compensated temperature,
  at an interruption of an operation of the temperature sensor, storing last internal states of the compensation model, and
  at a reactivation of the operation of the temperature sensor, estimating actual internal states of the compensation model depending on the stored last internal states, depending on an estimated course of the sensed temperature between the interruption and the reactivation, and depending on an estimated course of the information related to the electrical power consumed by the at least one heat source between the interruption and the reactivation.

12. A portable electronic device, comprising
  at least one heat source consuming electrical power during operation,
  a temperature sensor for sensing a temperature at a given location of the portable electronic device,
  a compensator
  for determining a compensated temperature dependent on at least the sensed temperature, information related to the electrical power consumed by the at least one heat source, and internal states of the compensator,
  for storing last internal states of a thermal model at an interruption of the operation of the temperature sensor, and,
  at a reactivation of the operation of the temperature sensor, for estimating actual internal states of the compensator depending on the stored last internal states, depending on an estimated course of the temperature between the interruption and the reactivation, and depending on an estimated course of the information related to the electrical power consumed by the at least one heat source between the interruption and the reactivation.

13. A portable electronic device according to claim 12,
wherein the given location is a location of the temperature sensor where the temperature sensor is arranged for sensing an ambient temperature of the portable electronic device,
wherein the heat source at least includes a display, and
wherein the display is adapted to display a compensated ambient temperature.

14. A portable electronic device according to claim 12,
wherein the compensator is adapted to determine a compensated ambient temperature depending on a thermal conductivity of a heat path between the at least one heat source and the temperature sensor and depending on a thermal capacity of at least one of a thermal capacitance of the portable electronic device.

15. A portable electronic device according to claim 12,
wherein the compensator is adapted to adjust the sensed temperature by a temperature value representing an impact of heat released from the at least one heat source and propagated via one or more heat paths to the temperature sensor.

* * * * *